US011555712B2

(12) United States Patent
Bang et al.

(10) Patent No.: US 11,555,712 B2
(45) Date of Patent: Jan. 17, 2023

(54) APPARATUS FOR DISPLAYING VIRTUAL LANE IN PLATOONING AND METHOD THEREOF

(71) Applicants: HYUNDAI MOTOR COMPANY, Seoul (KR); KIA MOTORS CORPORATION, Seoul (KR)

(72) Inventors: Kyung Joo Bang, Seoul (KR); Chan Hwa Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 354 days.

(21) Appl. No.: 16/860,562

(22) Filed: Apr. 28, 2020

(65) Prior Publication Data

US 2021/0148724 A1    May 20, 2021

(30) Foreign Application Priority Data

Nov. 20, 2019  (KR) ........................ 10-2019-0149939

(51) Int. Cl.
| | |
|---|---|
| B60K 35/00 | (2006.01) |
| B60R 16/023 | (2006.01) |
| B60W 30/12 | (2020.01) |
| B60W 30/165 | (2020.01) |
| B60W 40/06 | (2012.01) |
| B60W 40/105 | (2012.01) |
| B60W 50/00 | (2006.01) |
| B60W 50/14 | (2020.01) |
| G01C 21/36 | (2006.01) |

(Continued)

(52) U.S. Cl.
CPC ..... *G01C 21/3658* (2013.01); *G01C 21/3691* (2013.01); *G05D 1/0231* (2013.01); *G05D 1/0287* (2013.01); *G08G 1/20* (2013.01)

(58) Field of Classification Search
CPC ........ B60W 30/165; B60W 2554/802; B60W 2754/20; B60W 50/14; B60W 30/12; B60W 40/06; B60W 40/105; B60W 2050/0005; B60W 2050/146; B60W 2420/42; B60W 2520/10; B60W 2520/14; B60W 2540/18; B60K 2370/152; B60K 2370/175; G01C 21/3658; G01C 21/3691; G05D 1/0231; G05D 1/0287; G08G 1/20; G08G 1/167; G08G 1/22; B60R 16/0231; B60R 2300/20; B60R 2300/804; B60R 2556/65
USPC ......................................................... 701/523
See application file for complete search history.

(56) References Cited

U.S. PATENT DOCUMENTS

2020/0169662 A1* 5/2020 Watanabe .......... H04N 5/23238
2021/0350709 A1* 11/2021 Li .............................. G08G 1/22
(Continued)

OTHER PUBLICATIONS

The effect of see-through truck on driver monitoring patterns and responses to critical events in truck platooning (https://research.utwente.nl/en/publications/the-effect-of-see-through-truck-on-driver-monitoring-patterns-and (Year: 2017).*

*Primary Examiner* — Abby Y Lin
*Assistant Examiner* — Hossam M Abd El Latif
(74) *Attorney, Agent, or Firm* — Lempia Summerfield Katz LLC

(57) ABSTRACT

An apparatus for displaying a virtual lane may include: a processor to generate the virtual lane by converting lane information of a preceding vehicle into lane information viewed in a viewpoint of a host vehicle, in platooning, and a display to display the virtual lane.

19 Claims, 11 Drawing Sheets

(51) Int. Cl.
 *G05D 1/02* (2020.01)
 *G08G 1/00* (2006.01)
 *G08G 1/16* (2006.01)

(56) References Cited

U.S. PATENT DOCUMENTS

2022/0072959 A1* 3/2022 Matsui .................. B60K 37/02
2022/0108552 A1* 4/2022 Chi ....................... B60W 40/10

* cited by examiner

APPARATUS FOR DISPLAYING VIRTUAL LANE IN PLATOONING AND METHOD THEREOF

CROSS-REFERENCE TO RELATED APPLICATION

This application claims priority to and the benefit of Korean Patent Application No. 10-2019-0149939, filed on Nov. 20, 2019, the entire contents of which are incorporated herein by reference.

FIELD

The present disclosure relates to an apparatus for displaying a virtual lane in platooning and a method thereto, and more particularly to a technology of displaying a virtual lane using lane information of a preceding vehicle.

BACKGROUND

The statements in this section merely provide background information related to the present disclosure and may not constitute prior art.

Platooning is a technology that a plurality of vehicles, which are aligned with each other in line while being spaced apart from each other by a specified distance, perform autonomous driving. During platooning, a leading vehicle, which is positioned at the front most of a platoon, may control at least one following vehicle which follows the leading vehicle. The leading vehicle may maintain the distance between the plurality of vehicles included in the platoon and may exchange the behaviors of the plurality of vehicles included in the platoon and situation information through inter-vehicle communication.

The inter-vehicle distance between vehicles in the platoon may be maintained to be significantly short, such that fuel efficiency is enhanced. The inter-vehicle distance (in a longitudinal direction) may be controlled to be automatically maintained by a platooning controller.

However, the transverse steering of the vehicle may be designed to be directly controlled by a driver depending on components of a sensor and a steering device.

In this case, we have discovered that although the driver has to perform the transverse steering when the inter-vehicle distance is short, a larger preceding vehicle (LV), such as a truck that is travelling together at a close distance (about 5 m to 15 m) as illustrated in FIG. 1, may obstruct the visual field of the driver of the FV, thereby causing the driver to have a large burden of the transverse steering.

SUMMARY

The present disclosure provides an apparatus for displaying a visual lane in platooning, capable of providing, to a driver of a following vehicle, virtual lane information obtained by converting lane information measured by a preceding vehicle into lane information viewed in a viewpoint of the following vehicle, thereby allowing the driver of the following vehicle to safely drive the following vehicle based on the virtual lane information even if the visual field of the driver of the following vehicle is obstructed, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for displaying a virtual lane may include a processor to generate the virtual lane by converting lane information of a preceding vehicle into lane information viewed in a viewpoint of a host vehicle, in platooning, and a display to display the virtual lane.

According to one form of the present disclosure, the processor may determine whether a failure occurs during the platooning, based on at least one of a communication state, a front sensor state, or an inter-vehicle distance state.

According to some forms of the present disclosure, the processor may convert the converted lane information viewed in the viewpoint of the host vehicle into lane information viewed in a viewpoint of an augmented reality image.

According to some forms of the present disclosure, the processor may convert lane information, which is measured based on a camera coordinate system, of the preceding vehicle, into information based on a world coordinate system.

According to some forms of the present disclosure, the processor may rotate the lane information of the preceding vehicle based on a heading angle of the preceding vehicle and a heading angle of the host vehicle.

According to some forms of the present disclosure, the processor may shift the rotated lane information by a lateral distance and a longitudinal distance from an origin point of the host vehicle to an origin point of the preceding vehicle.

According to some forms of the present disclosure, the processor may determine whether generation of a route of the host vehicle is possible, based on a measurement state of at least one of a vehicle speed, a yaw rate, or a steering angle of the host vehicle.

According to some forms of the present disclosure, the processor may generate the route of the host vehicle based on the at least one of the vehicle speed, the yaw rate, or the steering angle.

According to some forms of the present disclosure, the processor may perform a control operation to display the route of the host vehicle on a virtual lane, which is generated through the conversion in the viewpoint of the host vehicle.

According to some forms of the present disclosure, when a vehicle speed is less than a predetermined value, the processor may calculate a radius of a host vehicle moving route based on a steering gear ratio, a wheel base, or a steering angle, of the host vehicle.

According to some forms of the present disclosure, when the vehicle speed is equal to or greater than the predetermined value, the processor may calculate the radius of the vehicle moving route using the vehicle speed and the yaw rate of the host vehicle.

According to some forms of the present disclosure, the processor may generate a route of the host vehicle based on an origin point of the host vehicle by using the radius of the vehicle moving route.

According to some forms of the present disclosure, the processor may display the route of the host vehicle by converting the route of the host vehicle into a route viewed in a viewpoint of an augmented reality image.

According to some forms of the present disclosure, the processor may determine a lane departure time point by using the lane information of the preceding vehicle and a route of the host vehicle, and when the lane departure time point is less than a predetermined value, provide the lane departure warning.

According to some forms of the present disclosure, a distance between at least one point of points of the virtual lane and a central point of a route of the host vehicle is equal to or less than a predetermined distance, the processor may determine that determination of a lane departure time point is possible.

According to some forms of the present disclosure, the processor may determine a lane departure predicted point which has the greatest longitudinal distance from the host vehicle within one or more points of the virtual lane which are equal to or less than a predetermined distance from a central point of the route of the host vehicle.

According to some forms of the present disclosure, the processor may calculate a lane departure predicted time by using a vehicle speed of the host vehicle and a distance to the lane departure predicted point from a present point of the host vehicle, and when the lane departure predicted time is less than a predetermined value, provide a lane departure warning.

According to some forms of the present disclosure, the processor may display a warning message for the lane departure warning in a pop-up form on the virtual lane, and display a departure lane, which includes the lane departure predicted point, of virtual lanes, differently in color or thickness, or display the departure lane to be flickered.

According to some forms of the present disclosure, the display may display the virtual lane, the host vehicle moving route, and a lane departure warning in a form of an augmented reality image on a wind shield glass of the host vehicle.

According to another aspect of the present disclosure, a method for displaying a virtual lane may include generating the virtual lane by converting lane information of a preceding vehicle into lane information viewed in a viewpoint of a host vehicle, in platooning, and displaying the virtual lane obtained through the conversion in the viewpoint of the host vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
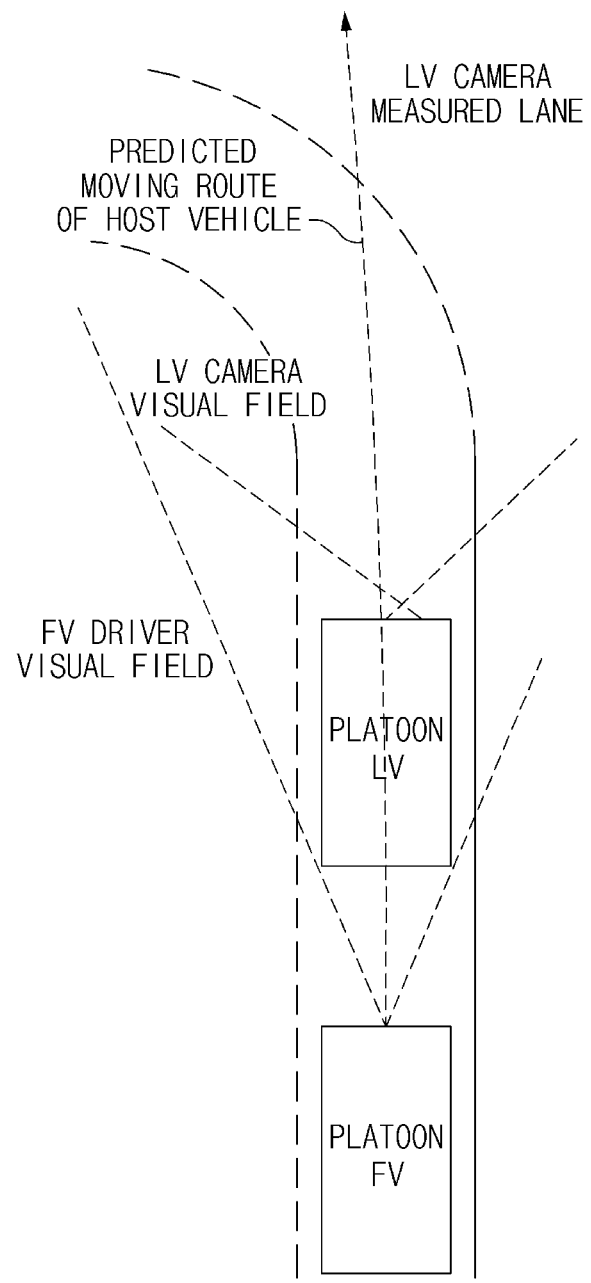
FIG. 1 is a view illustrating a visual field of a driver of a following vehicle in typical platooning.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the forms of the present disclosure, a detailed description of well-known features or functions will be ruled out in order not to unnecessarily obscure the gist of the present disclosure.

In describing the components of the exemplary forms according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, the exemplary forms of the present disclosure will be described in detail with reference to FIGS. 2 to 11.

A leading vehicle (LV) and a following vehicle (FV) included in a platooning group may perform platooning on a road. The LV and the FV may travel while maintaining a specific distance therebetween. The LV or the FV may adjust the distance between the LV and the FV during travelling. The LV or the FV may increase or decrease the inter-vehicle distance depending on the manipulation of a driver. The FV performs transverse steering control based on virtual lane information generated using lane information of a preceding vehicle, and the virtual lane information will be described below.

Figure 2:
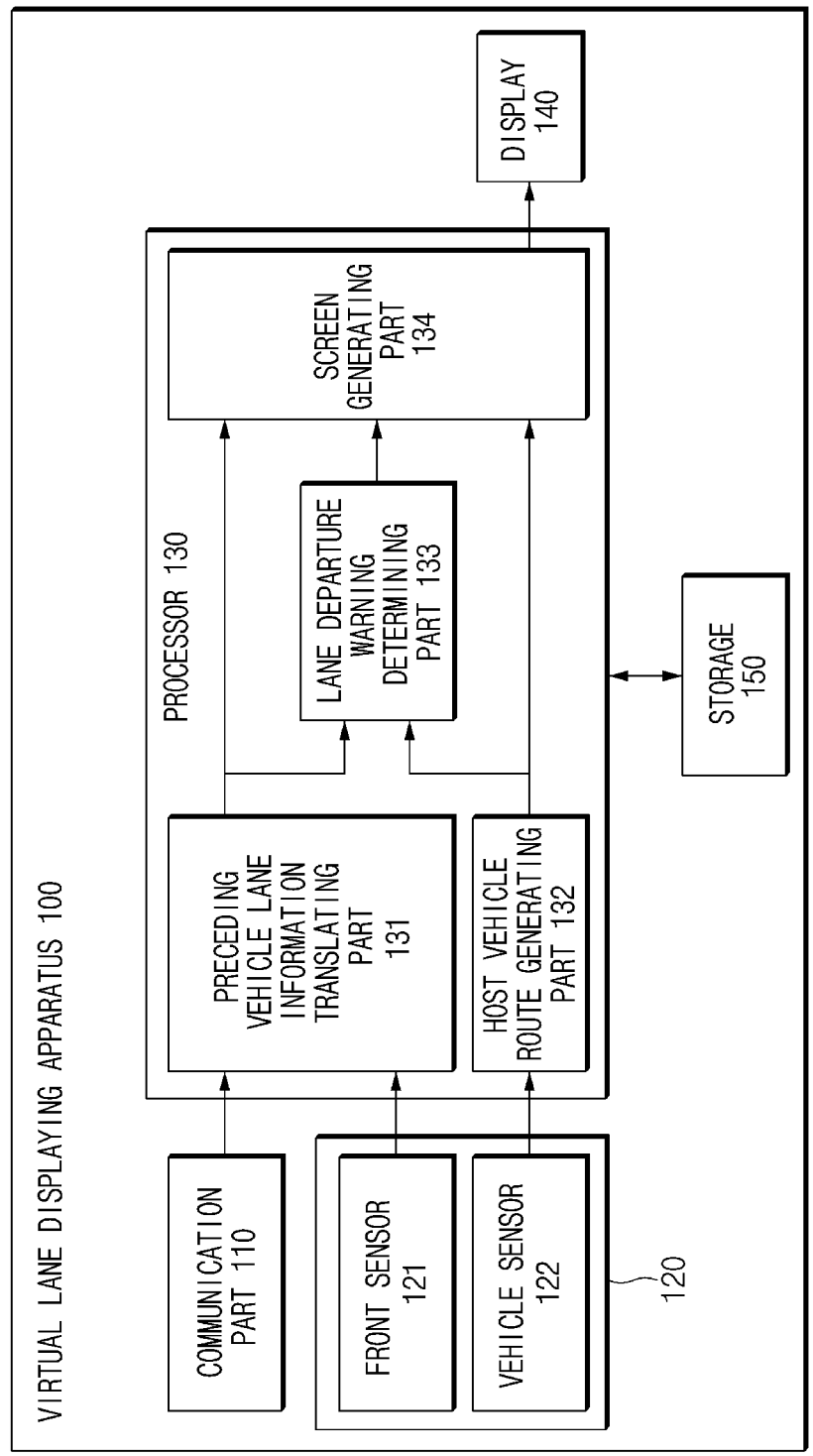
FIG. 2 is a block diagram illustrating the configuration of an apparatus for displaying a virtual lane.

FIG. 2 is a block diagram illustrating the configuration of a virtual lane displaying apparatus, according to one form of the present disclosure.

Referring to FIG. 2, the virtual lane displaying apparatus 100 may include: a communication part 110, a sensing part 120, a processor 130, a display 140, and a storage 150.

In platooning, the virtual lane displaying apparatus 100 may generate a virtual lane by converting lane information of a preceding vehicle into lane information viewed in the viewpoint of a host vehicle and display the virtual lane on a wind shield glass of the host vehicle. Accordingly, the virtual lane is displayed to help a driver of the host vehicle, which travels in the back, to perform steering control, even if a front lane is hidden by the preceding vehicle. In this case, the host vehicle may travel while following the preceding vehicle immediately after the preceding vehicle.

According to one form of the present disclosure, the virtual lane displaying apparatus 100 may be implemented inside a vehicle. In this case, the virtual lane displaying apparatus 100 may be implemented integrally with internal control units of the vehicle. Alternatively, the virtual lane displaying apparatus 100 may be implemented separately from the internal control units of the vehicle and may be connected with the internal control units of the vehicle through an additional connection unit.

The communication part 110, which is a hardware device implemented with various electronic circuits to transmit or receive a signal through wireless or wired connection, may make V2V communication through an in-vehicle network communication technology or, wireless Internet access or short range communication technology with an external server of a vehicle, an infrastructure, and other vehicles. In this case, the vehicle network communication technology may include a controller area network (CAN) communication technology, a local interconnect network (LIN) communication technology, a FlexRay communication technology, and in-vehicle communication may be performed through the above communication technology. In addition, the wireless communication technology may include a wireless LAN (WLAN), a wireless broadband (Wibro), a Wi-Fi, World Interoperability for Microwave Access (Wimax). The short range communication technology may include Bluetooth, ZigBee, ultra wideband (UWB), radio frequency identification (RFID), or infrared data association (IrDA).

For example, the communication part 110 may share platooning information through V2V communication between the platooning vehicles. In this case, the platooning information may include surrounding information measured by a sensor of the host vehicle, steering angle information of the host vehicle, a platooning speed, an inter-vehicle speed, a destination, a route, or front lane information.

The sensing part 120 senses information (e.g., a relative speed, a distance, or a moving distance) of the preceding vehicle in the front and information (e.g., a yaw rate, a steering angle, or a vehicle speed of the host vehicle) for generating a route (host vehicle route) of the host vehicle. To this end, the sensing part 120 includes a front sensor 121 and a vehicle sensor 122.

The front sensor 121 measures a longitudinal distance and a lateral distance between a rear portion of the preceding vehicle in the front and the host vehicle (a rear vehicle).

The vehicle sensor 122 may measure the yaw rate, the steering angle, or the vehicle speed of the host vehicle.

To this end, the sensing part 120 may include an ultrasonic sensor, a radar, a camera, a laser scanner or a corner radar, a LiDAR, an acceleration sensor, a yaw rate sensor, a torque measurement sensor or a wheel speed sensor, and a steering angle sensor.

The processor 130 may be electrically connected with the communication part 110, the sensing part 120, the display 140, and the storage 150, and the like, may electrically control each component, and may be an electric circuit that executes software commands. Accordingly, the processor 130 may perform various data processing and calculation, to be described below. The processor 130 may process signals transmitted between the components of the virtual lane displaying apparatus 100.

The processor 130 determines whether a failure occurs during platooning, based on at least one of a communication state, a front sensor state, or an inter-vehicle distance state. When the platooning is in a normal state, the processor 130 may generate a virtual lane by converting the lane information of the preceding vehicle into lane information viewed in the viewpoint of the host vehicle (a rear vehicle of the preceding vehicle).

The processor 130 may perform a control operation to convert the lane information converted to be viewed in the viewpoint of the host vehicle, lane information viewed in the viewpoint of an augmented reality image, to display the converted lane information on the display 140. In this case, the display 140 may be implemented on the wind shield glass of the host vehicle. In this case, the lane information provided in the viewpoint of the host vehicle may be image information actually photographed by a camera, and the augmented reality image may be an image including both the actual image information and virtual information and may be provided in the viewpoint of the driver.

The processor 130 may convert the lane information, which is measured based on a camera coordinate system, of the preceding vehicle into information based on a world coordinate system, and may rotate the lane information of the preceding vehicle based on a heading angle of the preceding vehicle and a heading angle of the host vehicle in the world coordinate system. In other words, the processor 130 may rotate the lane information of the preceding vehicle by the difference between the heading angle of the preceding vehicle and the heading angle of the host vehicle.

In addition, the processor 130 may shift the rotated lane information by the lateral distance and the longitudinal distance from an origin point of the host vehicle to an origin point of the preceding vehicle. Accordingly, the lane information in the viewpoint of the preceding vehicle may be converted into lane information viewed in the viewpoint of the host vehicle in the world coordinate system.

The processor 130 may determine whether generation of the route of the host vehicle is possible, based on the measurement state of at least one of a vehicle speed, a yaw rate, or a steering angle. In other words, the processor 130 may determine that the generation of the route of the host vehicle is possible when at least one of the vehicle speed, the yaw rate or the steering angle is measured.

The processor 130 may perform control operations to generate the route of the host vehicle based on the at least one of the vehicle speed, the yaw rate, or the steering angle, and to display the route of the host vehicle on the virtual lane, which is generated through the conversion in the viewpoint of the host vehicle.

The processor 130 may calculate a radius of a host vehicle moving route based on a steering gear ratio, a wheel base, and a steering angle, when the vehicle speed is less than a predetermined, and may calculate the radius of the vehicle moving route based on the vehicle speed and the yaw rate, when the vehicle speed is equal to or greater than the predetermined. Thereafter, the processor 130 may generate the route of the host vehicle based on an origin point of the host vehicle by using the radius of the vehicle moving route. The processor 130 may perform control operations to convert the route of the host vehicle into a route viewed in the viewpoint of the augmented reality image and to display the route of the host vehicle on the virtual lane.

The processor 130 may determine a lane departure time point by using lane information of the preceding vehicle and the route of the host vehicle, may provide the lane departure warning when the lane departure time point is less than the predetermined value, and may terminate the process without the lane departure warning when the lane departure time point is equal to or greater than the predetermined value.

The processor 130 may determine that determination of a lane departure time point is possible, when a coordinate, which allows a distance to a central point of a route of the host vehicle to be within a preset distance range, is present in coordinates of the virtual lane. In other words, the processor 130 may determine that determination of a lane departure time point is possible, when at least one of one or more points of the virtual lane are equal to or less than a predetermined distance from a central point of the route of the host vehicle.

The processor 130 may determine, as a lane departure predicted point, a point, which makes a greatest longitudinal distance from the host vehicle, in coordinates, which allow the distance to the central point of the route of the host vehicle to be within the preset distance range, of the coordinates of the virtual lane. In other words, the processor 130 may determine lane departure predicted point which has the greatest longitudinal distance from the host vehicle within one or more points of the virtual lane which are equal to or less than a predetermined distance from a central point of the route of the host vehicle The processor 130 may calculate a lane departure predicted time by using a vehicle speed of the host vehicle and a distance to the lane departure predicted point from a present point of the host vehicle, and provide a lane departure warning when the lane departure predicted time is less than a predetermined value.

The processor 130 may output a warning message for the lane departure warning in a pop-up form, on the virtual lane, may differently display, in color and thickness, a departure lane, which includes the lane departure predicted time point, of virtual lanes.

According to the present form, the processor 130 may be implemented with a preceding vehicle lane information converting part 131, a host vehicle route generating part 132, a lane departure warning determining part 133, and a screen generating part 134.

The preceding vehicle lane information converting part 131 may convert the lane information, which is measured in the viewpoint of the preceding vehicle by using the difference between the heading angle of the preceding vehicle and the heading angle of the rear vehicle, and the longitudinal distance and the lateral distance to the preceding vehicle, into lane information viewed in the viewpoint of the rear vehicle.

The host vehicle route generating part 132 may generate the predicted moving route of the host vehicle using the sensing result of the vehicle senor 122.

The lane departure warning determining part 133 may determine the lane departure predicted time point using the lane information of the preceding vehicle and the host vehicle route and may generate a lane departure warning signal when the lane departure predicted time point is less than a threshold value.

The screen generating part 134 may form lane information viewed in the viewpoint of the rear vehicle by converting the lane information viewed in the viewpoint of the rear vehicle into lane information viewed in the viewpoint of the augmented reality image.

The display 140 may include an input device to receive a control command from a user and an output device to output the operation state and the operation result of the virtual lane displaying apparatus 100. In this case, the input device may include a key button, and may include a mouse, a joystick, a jog shuttle, a stylus pen, or the like. In addition, the input device may include a soft key implemented on a display. The output device may include a display and may include a voice output device such as a speaker. In the case that a touch sensor product, such as a touch film, a touch sheet, a touch pad, or the like, is included in the display, the display may operate as a touch screen, and the input device and the output device may be implemented in the integral form. According to the present disclosure, the output device may display a virtual lane on a front portion of the driving road, a host vehicle moving route, or a lane departure warning in the viewpoint of the augmented reality image or the viewpoint of the normal image of the host vehicle. The output device may be implemented with an augmented reality image display to output the augmented reality image. The normal image of the host vehicle may include the information on the real image without the virtual information and may be provided in the viewpoint of the host vehicle. The augmented reality image may include an image having added information virtually generated and may be provided in the viewpoint of the driver.

In this case, the display may include at least one of a liquid crystal display (LCD), a thin film transistor-liquid crystal display (TFT LCD), an organic light-emitting diode (OLED), a flexible display, a field emission display (FED), or a three dimensional display (3D display)

The storage 150 may store the sensing result of the sensing part 120, measured information received from the preceding vehicle, and data or algorithms necessary for the virtual lane displaying apparatus 100 to operate.

For example, the storage 150 may store platooning information such as front lane information measured by the preceding vehicle, which is received from the preceding vehicle in the platoon through the communication part 110. In addition, the storage 150 may store information on an obstacle, such as the preceding vehicle, sensed by the sensing part 120. The storage 150 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

As described above, according to the present disclosure, the lane information measured by the preceding vehicle is converted into lane information viewed in the view point of the rear vehicle and displayed on the AR display of the wind shield glass. Accordingly, the driver of the rear vehicle may guess the shape of the front lane to perform steering control. In addition, according to the present disclosure, the predicted moving route of the host vehicle is displayed together, and the lane departure is warned when the lane departure predicted time point is less than the threshold value, such that the driver recognizes the lane departure in advance and avoids the lane departure.

As described above, according to the present disclosure, even if the visual field of the driver is limited due to the preceding vehicle travelling with the narrowed inter-vehicle distance, the driver of the rear vehicle, which follows the preceding vehicle, may easily perform the steering control, thereby reducing the burden of the driver of the rear vehicle. In addition, when the rear vehicle fails to smoothly follow the preceding vehicle, a warning is made, thereby improving the safety of the platoon.

The following description will be made with reference to FIGS. 3A to 6C, regarding the procedure that the front lane information, which is measured by the preceding vehicle, is converted into lane information viewed in the viewpoint of the following vehicle.

Figure 3A:
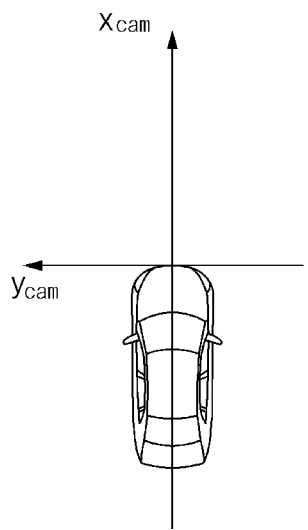
FIGS. 3A and 3B are views respectively illustrating a coordinate system for viewpoint conversion.
Figure 3B:
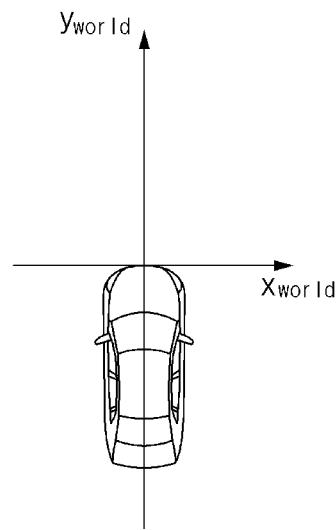
Figure 3C:
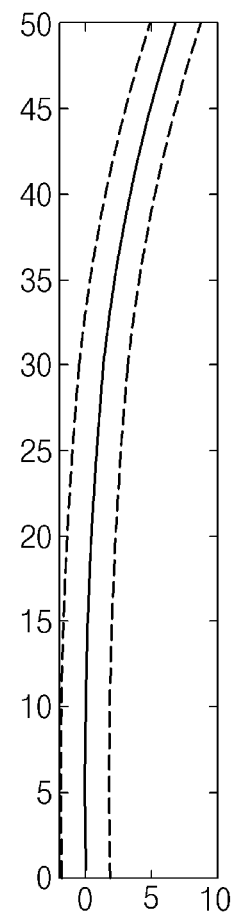
FIG. 3C is a view illustrating a lane displayed in a coordinate system.
Figure 4C:
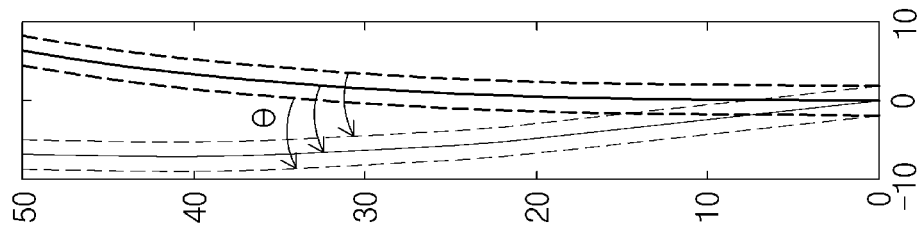
FIGS. 4A, 4B and 4C are views respectively illustrating that lane information in a viewpoint of a preceding vehicle is converted into lane information viewed in a viewpoint of a rear vehicle by using a heading angle.
Figure 4B:
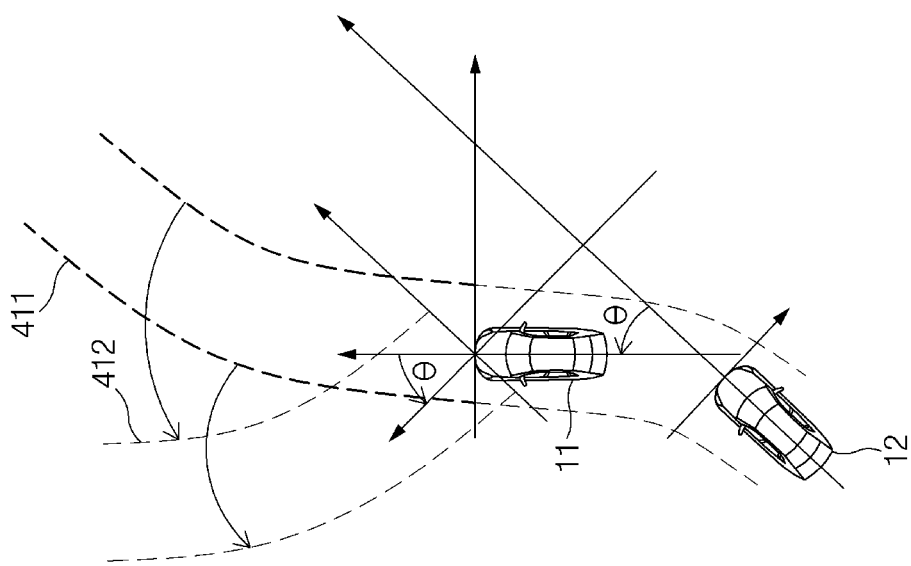
Figure 4A:
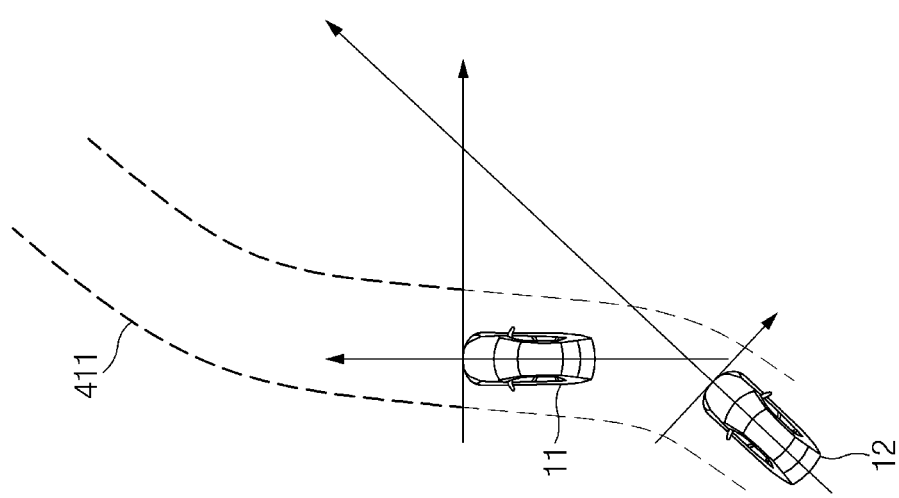
Figures 5A, 5B:
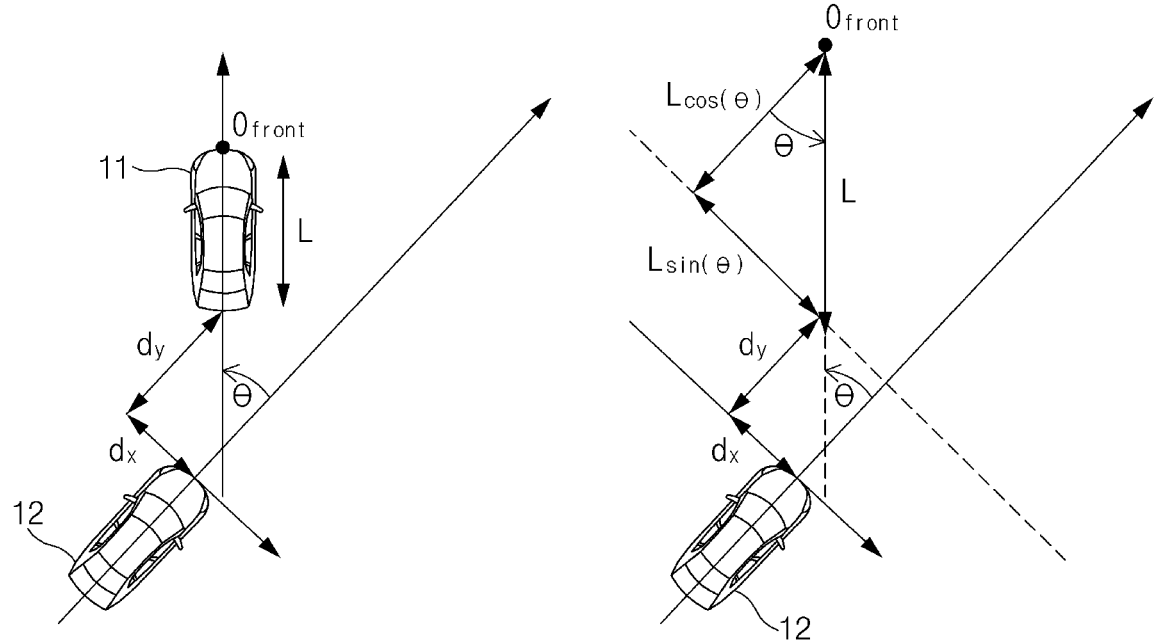
FIGS. 5A and 5B are views respectively illustrating that lane information in a viewpoint of a preceding vehicle is converted into lane information viewed in a viewpoint of a rear vehicle through the movement of the longitudinal/lateral distance to the preceding vehicle.
Figure 6C:
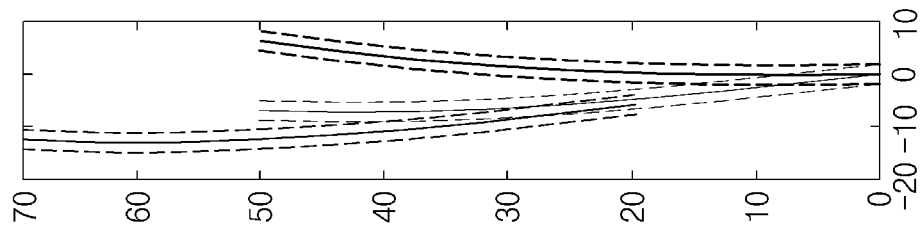
FIGS. 6A, 6B and 6C are views respectively illustrating that lane information in a viewpoint of a preceding vehicle is converted into lane information viewed in a viewpoint of a rear vehicle.
Figure 6B:
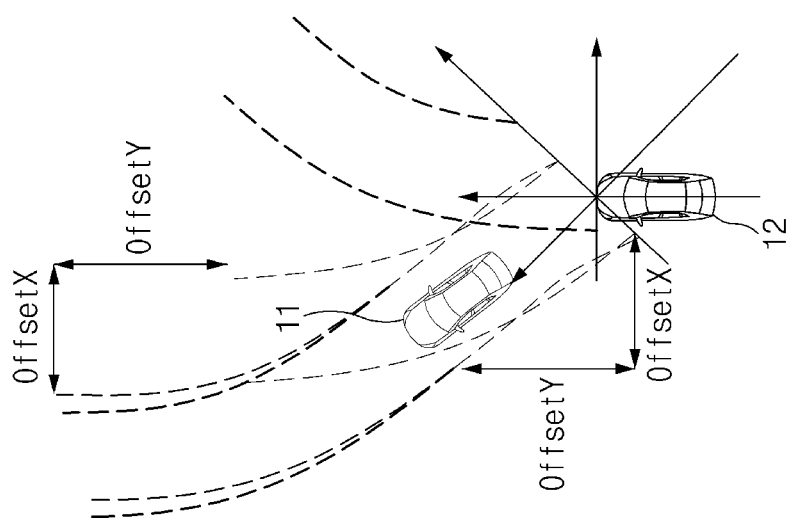
Figure 6A:
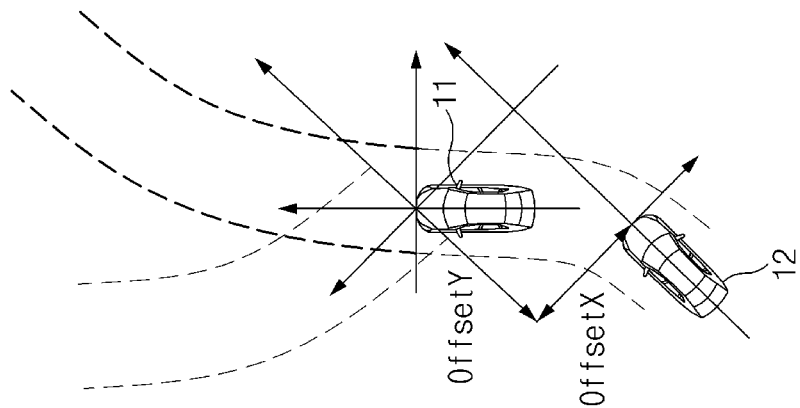

FIGS. 3A and 3B are views respectively illustrating a coordinate system for viewpoint conversion, and FIG. 3C illustrates a lane displayed in a world coordinate system, according to one form of the present disclosure. FIGS. 4A, 4B and 4C are views respectively illustrating that the lane information viewed in the viewpoint of the preceding vehicle is converted into lane information viewed in the viewpoint of the rear vehicle using the heading angle, according to one form of the present disclosure. FIGS. 5A and 5B are views respectively illustrating that the lane information viewed in the viewpoint of the preceding vehicle is converted into lane information viewed in the viewpoint of the rear vehicle through the movement of the longitudinal/lateral distance to the preceding vehicle, according to one form of the present disclosure, and FIGS. 6A, 6B and 6C are views respectively illustrating that the lane information in the viewpoint of the preceding vehicle is converted lane information viewed in the viewpoint of the rear vehicle, according to one form of the present disclosure.

The front lane information measured by the preceding vehicle is measured with the coefficients of a cubic equation. To convert the front lane information into lane information viewed in the viewpoint of the rear vehicle, the viewpoint has to be rotated or shifted in parallel. The cubic equation may developed and solved. In this case, since the x and y exist up to 3rd order tams respectively, the procedure of solving the Equation is very complex. Therefore, according to the present disclosure, as the front lane is divided in the unit of a specific distance, coordinates may be found, and processing based on numerical analysis may be performed using the set of the coordinates.

First, the virtual lane displaying apparatus 100 converts the lane information of the preceding vehicle, which is expressed through the cubic equation, into the set of x and y coordinates as in FIG. 3A.

When the cubic equation of a lane, which is measured by a lane measuring camera of the preceding vehicle, in a camera coordinate system is $C_3 x^3 + C_2 x^2 C_1 x + C_0 = y$, a lane display target distance 50 m, and a display resolution is 0.1 m, following Equation 1 may be obtained.

$$\begin{array}{l}
c = [C_3,\ C_2,\ C_1,\ C_3] \\
x_{cam} = [0{:}0.1{:}50] = [0\ \ 0.1\ \ 0.2\ \ 0.3\ \ \ldots\ \ 49.8\ \ 49.9\ \ 50] \\
y_{cam} = polyval\ (c,\ x) \\
z_{cam} = zeros\ (1,\ 501) = zeros\ (1,\ length(x)) = [0\ \ 0\ \ 0\ \ \ldots\ \ 0\ \ 0\ \ 0] \\
Lane_{cam} = [x_{cam};\ y_{cam};\ z_{cam}]
\end{array}$$

Equation 1

The result may be converted into the world coordinate system (as illustrated in FIG. 3B) to be defined as Equation 2 below.

$$\begin{array}{l}
x_{world} = -y_{cam} \\
y_{world} = x_{cam} \\
Lane_{world} = [-y_{cam};\ x_{cam};\ z_{cam}] = [x_{world};\ y_{world};\ z_{world}]
\end{array}$$

Equation 2

FIG. 3C illustrate the lane that is displayed in the world coordinate system.

FIG. 4A discloses a front lane 411 in the viewpoint of the preceding vehicle 11, and FIG. 4B discloses an example 412 obtained through the conversion in the same viewpoint as the viewpoint when the front lane is viewed in a direction that a rear vehicle 12 travels. FIG. 4C discloses an example that the lane is displayed in the word coordinate system, in which the lane is rotated at an angle obtained by subtracting the heading angle of the rear vehicle from the heading angle of the front vehicle.

The virtual lane displaying apparatus 100 should rotate the lane information, which is viewed in the viewpoint of the preceding vehicle, by a value obtained by subtracting the heading angle of the rear vehicle from the heading angle of the preceding vehicle based on the z axis so as to make the front lane, which is viewed from the preceding vehicle 11, as that in the same viewpoint as a viewpoint when the rear vehicle 12 views the front lane in the traveling direction. In this case, a clockwise direction may be understood as a plus (+) direction.

When it is assumed that the value obtained by subtracting the heading angle of the rear vehicle from the heading angle of the preceding vehicle is 0, the rotation matrix (RotationMatrix) and the rotation degree of the lane may be defined as in Equation 3.

The rotation matrix(RotationMatrix)=[cos(θ)sin(θ)0;

−sin(θ)cos(θ)0;

0 0 1]

The rotation degree(RotatedLane) of the lane=RotationMatrix $X$ Lane$_{world}$   Equation 3:

As illustrated in FIG. 4B, after rotating the lane based on the traveling direction of the rear vehicle, the rotated lane should be shifted by the x and y directional distances (OffsetX and OffsetY) from the origin point of the rear vehicle 12 to the origin point of the front vehicle 11.

As illustrated in FIG. 5A, on the assumption that the longitudinal distance and the lateral distance to the preceding vehicle measured by the sensor of the rear vehicle 12 are $d_x$ and $d_y$, the length of the preceding vehicle and the origin point of the preceding vehicle are L and $O_{front}$ and following Equation 4 may be obtained.

OffsetX=$d_x$+L sin(θ)

OffsetY=$d_y$+L cos(θ)

OffsetZ=0   Equation 4:

As shown in FIG. 5B, when the rotated lane coordinates are shifted by OffsetX and OffsetY, the lane information, which is viewed in the viewpoint of the preceding vehicle in the world coordinate system, is converted into lane information viewed in the viewpoint of the rear vehicle. The converted lane information (ConvertedLane) is a sum of the rotation amounts of the lane coordinates OffsetX, OffsetY, and OffsetZ as shown in Equation 5 below.

ConvertedLane=RotatedLane+[OffsetX;OffsetY;OffsetZ]   Equation 5:

Therefore, after converting the lane information of the preceding vehicle into lane information viewed in the traveling direction of the rear vehicle 12 using heading angle as illustrated in FIG. 6A, the rotated lane coordinates are shifted by OffsetX and OffsetY as shown in FIG. 6B. Then, a front lane, which is changed from the viewpoint of the preceding vehicle to the viewpoint of the rear vehicle, may be generated and displayed as in FIG. 6B. FIG. 6C indicates a lane converted into a lane viewed in the viewpoint in the word coordinate system.

Figure 7A:
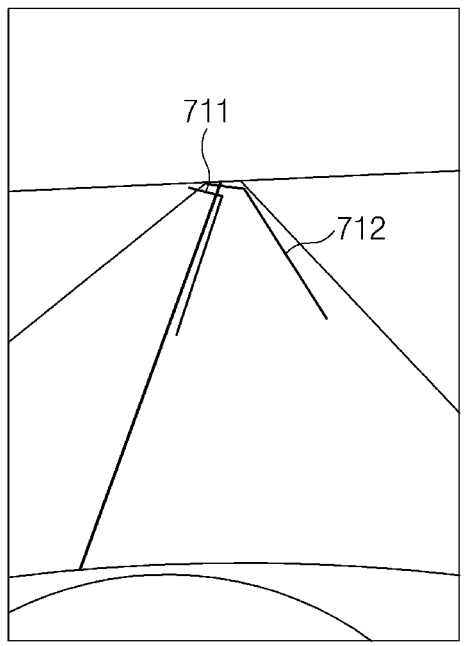
FIGS. 7A and 7B are views respectively illustrating that a front lane is displayed on a wind shield glass.
Figure 7B:
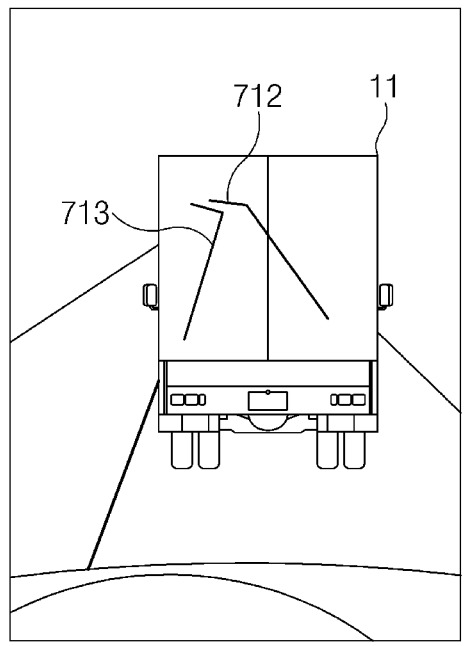

FIGS. 7A and 7B are views respectively illustrating that the front lane is displayed, according to one form of the present disclosure.

FIG. 7A illustrates an example of displaying lanes 711 and 712 measured by the preceding vehicle, and FIG. 7B illustrates an example of displaying virtual lanes 713 and 714 on a front augmented reality (AR).

The virtual lane displaying apparatus 100 converts the lane coordinates, which are viewed in the viewpoint of the rear vehicle and calculated in the world coordinate system, into coordinates viewed in an AR image viewpoint to be displayed on a vehicle windshield glass, and displays the converted lane information on the AR display (windshield glass).

Figure 8A:
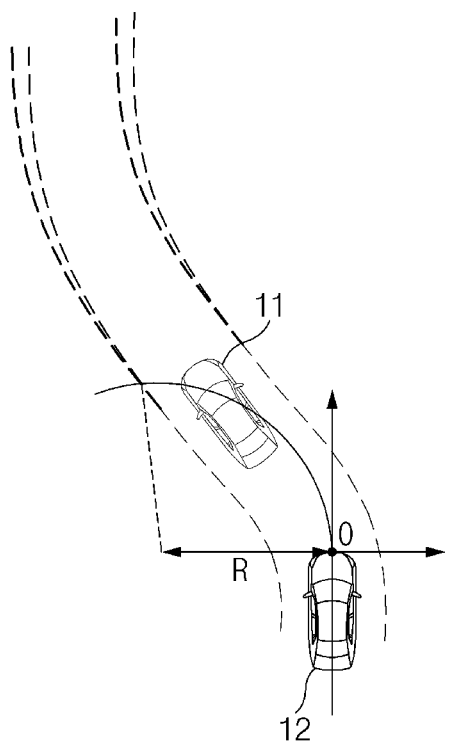
FIGS. 8A and 8B are views respectively illustrating a method for generating a route of a host vehicle and determining a lane departure point.
Figure 8B:
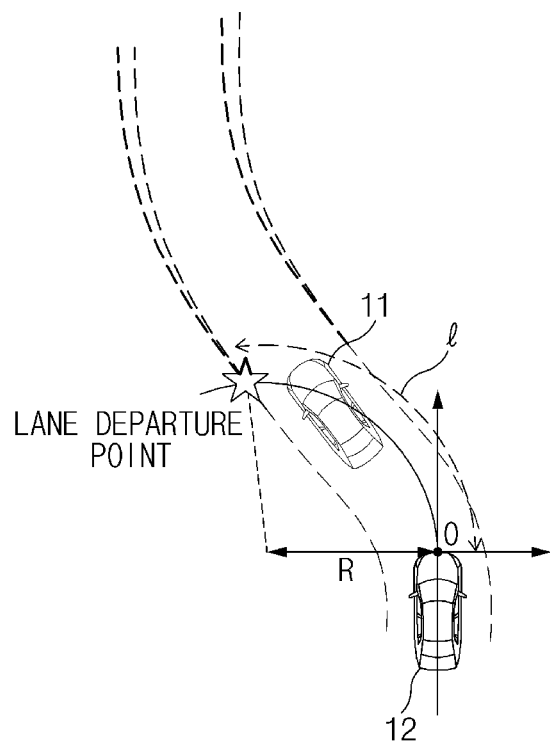
Figure 9A:
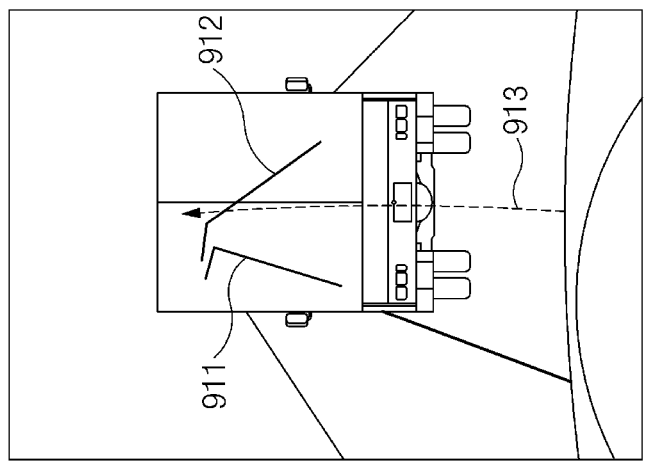
FIGS. 9A, 9B and 9C are views respectively illustrating that a route of a host vehicle and a lane departure warning are displayed.
Figure 9B:
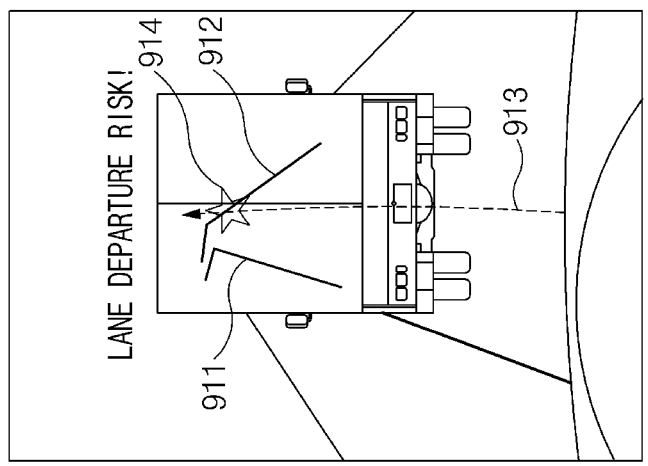
Figure 9C:
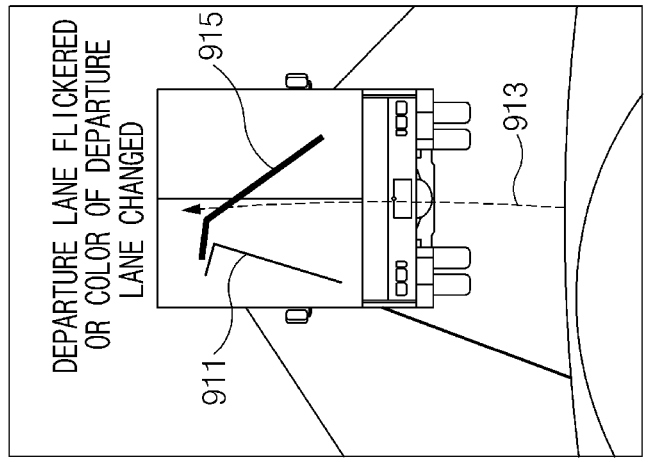

FIGS. 8A and 8B are views respectively illustrating a method for generating the route of the host vehicle and determining the lane departure point, according to another form of the present disclosure, and FIGS. 9A, 9B and 9C are views respectively illustrating that the route of the host vehicle and the lane departure warning are displayed, according to one form of the present disclosure.

Referring to FIGS. 8A and 8B, the method for generating the route of the host vehicle will be explained in detail.

The virtual lane displaying apparatus 100 may calculate the radius R of the vehicle moving route based on a steering angle, a steering gear ratio, and a wheel base as in following Equation 6, when the vehicle speed is less than a threshold value.

$$R = \frac{\text{Steering gear ratio} * \text{wheel base}}{\text{Steering angle}} \quad \text{Equation 6}$$

The virtual lane display apparatus 100 may calculate the radius R of the vehicle moving route using the speed and the yaw rate based on Equation 7 when the vehicle speed exceeds the threshold value.

$$R = \frac{\text{Speed}}{\text{Yaw rate}} \quad \text{Equation 7}$$

The virtual lane displaying apparatus 100 may generate the host vehicle route based on the origin point of the rear vehicle (the middle point of the front most end of the vehicle) by using the radius R of the vehicle moving route. The radius R may be defined as in following Equation 8.

$$(x-R)^2+y^2=R^2 \quad \text{Equation 8:}$$

In this case, 'x' refers to a lateral distance, and 'y' refers to a longitudinal distance.

FIG. 9A illustrates that virtual front lanes 911 and 912 are displayed on the wind shield glass and a host vehicle route 913 is additionally displayed. In other words, the virtual lane displaying apparatus 100 converts the host vehicle route of the rear vehicle, which is obtained in the world coordinate system, into a route viewed in the AR image viewpoint such that the host vehicle route is displayed on the wind shield glass, and the converted lane coordinates may be displayed on the wind shield glass.

As shown in FIG. 8B, the virtual lane displaying apparatus 100 may determine and display the lane departure predicted time point.

The virtual lane displaying apparatus 100 determines that the determination of the lane departure predicted time point is possible, and determines the lane departure predicted time point, when the measured information of the preceding vehicle is normal, when the generation of the host vehicle route is possible, and when there is present a coordinate, which makes the distance smaller than 'R' to the central point (−R, 0) of the host vehicle route, coordinates of the virtual lane.

The virtual lane displaying apparatus 100 may determine, as the lane departure time point, a point, which has the longest longitudinal distance of 'y' from the host vehicle, among coordinates of a virtual lane making a distance smaller than 'R' to the central point (−R, 0) of the route of the host vehicle, and the time point (time to cross) that lane departure is predicted may be calculated using the speed of the host vehicle and the distance to the point that the lane is departed as in following Equation 9.

$$\text{Lane departure predicted time point} = \frac{l}{\text{Speed}} \quad \text{Equation 9}$$

The virtual lane displaying apparatus 100 may display and terminate a lane departure warning when the lane departure predicted time point is less than a threshold value, or may terminate the lane departure warning without displaying the lane departure warning when the lane departure predicted time point is equal to or greater than the lane departure predicted time point. Referring to FIG. 9B, the virtual lane displaying apparatus 100 may display a lane departure point 914 on a virtual lane 912, may display the warning message of "Lane Departure Risk" in a pop-up form, and may display that the warning message in the pop-up form is flickered. Referring to FIG. 9C, the virtual lane displaying apparatus 100 may differently display, in thickness or color, a lane 915, which is to be predicted to be departed, of virtual lanes 911 and 912, and may display the lane 915 to be flickered.

Figure 10:
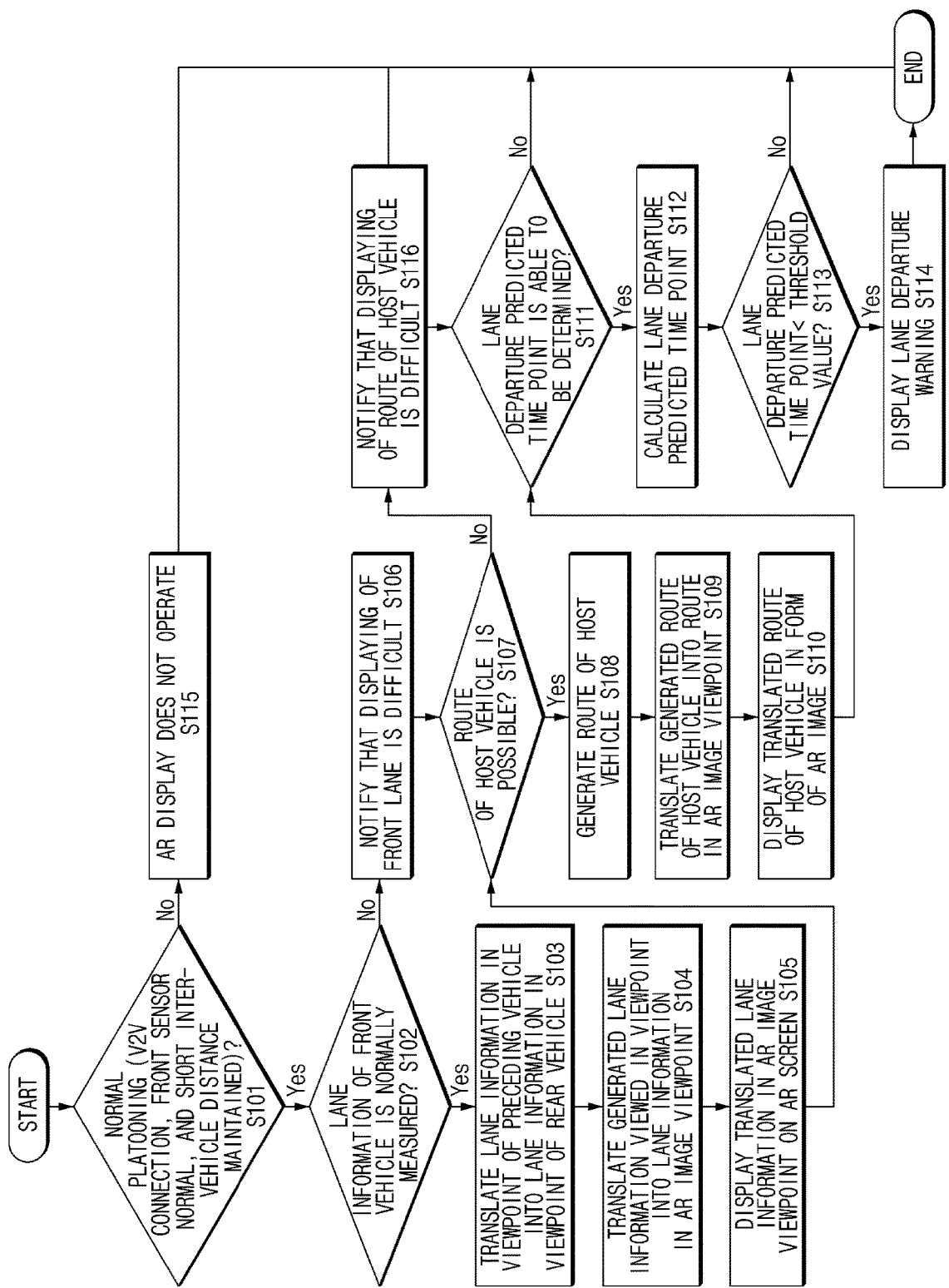
FIG. 10 is a flowchart illustrating a method for displaying a virtual lane.

Hereinafter, a method for displaying a virtual lane will be described in detail with reference to FIG. 10, according to one form of the present disclosure. FIG. 10 is a flowchart illustrating the method for displaying the virtual lane.

Hereinafter, it is assumed that the virtual lane displaying apparatus 100 of FIG. 1 performs the process of FIG. 10.

Referring to FIG. 10, the virtual lane displaying apparatus 100 determines whether platooning is currently normal (S101).

In this case, the virtual lane displaying apparatus 100 may determine whether V2V communication connection is normal, the front sensor is normal, or the front visual field is limited due to the short inter-vehicle distance, to determine whether the platooning is normal. To the contrary, the virtual lane displaying apparatus 100 may determine that the platooning is not normal when the platooning is not performed, or when the front sensor or the communication device is failed.

When the current platooning is not normal, the virtual lane displaying apparatus 100 may determine that logic of displaying the virtual lane is not necessary to operate, or is in a disable state, and does not perform a display operation (S115).

When the platooning is normal, the virtual lane displaying apparatus 100 determines whether the lane information of the preceding vehicle, which is received from the preceding vehicle, is normally measured, for the logic of displaying the virtual lane (S102). In this case, the virtual lane displaying apparatus 100 may determine whether the lane information of the preceding vehicle to generate the virtual lane is normally received to determine whether the lane information of the preceding vehicle is normally measured information.

The virtual lane displaying apparatus 100 notifies a driver of that the displaying of the front lane is difficult, when the lane information of the preceding vehicle is not the normally measured information (S106). In this case, the virtual lane display apparatus 100 may audibly or visually provide a notification of that the displaying of the front lane is difficult. Thereafter, the virtual lane displaying apparatus 100 may determine whether the generation of the route of the host vehicle is possible (S107). The procedure related to the generation of the route of the host vehicle will be described later.

When the lane information of the preceding vehicle is the normally measured information, the virtual lane displaying apparatus 100 converts the lane information in the viewpoint of the preceding vehicle into lane information in the viewpoint of the rear vehicle (S103).

In this case, the virtual lane displaying apparatus 100 may perform the processing based on numerical analysis using the set of coordinates found as the lane of the preceding vehicle is divided in the unit of a specific distance, thereby converting the lane information into lane information in the AR image viewpoint. In addition, the virtual lane displaying apparatus 100 may use various algorithms for the conversion.

Thereafter, the virtual lane displaying apparatus 100 may convert the generated lane information viewed in the viewpoint into lane information in the AR image viewpoint (S104). The lane coordinates, which is obtained in the world coordinate system, in the viewpoint of the rear vehicle are converted into lane coordinates in the AR image viewpoint such that the lane coordinates are displayed on the wind shield glass.

The virtual lane displaying apparatus 100 displays the converted lane information in the AR image viewpoint on the AR screen (S105). In this case, the steering information displaying apparatus 100 may display the virtual lane on the wind shield glass using the converted lane coordinates in the AR image viewpoint as in FIG. 7B.

Thereafter, the virtual lane displaying apparatus 100 determines whether the generation of the host vehicle route is possible (S107).

The virtual lane displaying apparatus 100 notifies that the own vehicle route cannot be displayed when generation of the own vehicle route is impossible (S116).

The virtual lane displaying apparatus 100 generates the own vehicle route when the generation of the own vehicle route is possible (S108), converts the generated host vehicle route into a host vehicle route in the AR image viewpoint (S109), and displays the converted host vehicle route in the AR image viewpoint on the AR screen (S131). As shown in FIG. 9A, the virtual lane displaying apparatus 100 may display the host vehicle route 913 together with the virtual lanes 911 and 912.

Thereafter, the virtual lane displaying apparatus 100 determines whether the lane departure predicted time point is able to be determined (S111).

When the lane departure predicted time point is able to be determined, the virtual lane displaying apparatus 100 calculates the lane departure predicted time point (S112).

The virtual lane displaying apparatus 100 may determine whether the lane departure predicted time point is less than the threshold value (S113), and may display the lane departure warning when the lane departure predicted time point is less than the threshold value (S114). As illustrated in FIGS. 9B and 9C, the virtual lane displaying apparatus 100 may display the lane departure warning by displaying the lane departure risk warning message in the pop-up form, by changing the color or the thickness of the departure lane, or by flickering the departure lane.

The virtual lane displaying apparatus 100 terminates the lane departure warning when the lane departure predicted time point is equal to or greater than the threshold value.

As described above, according to the present disclosure, when the visual field of the rear vehicle, which follows the preceding vehicle, is obstructed by the large preceding vehicle, such as a truck, at a shorter distance in platooning, the lane information measured by the preceding vehicle is received from the preceding vehicle through the V2V communication, and the virtual lane is generated and displayed based on the lane information measured by the preceding vehicle such that the front lane hidden by the preceding vehicle is viewed. Accordingly, the driver of the rear vehicle may more comfortably and safely attend platooning.

Figure 11:
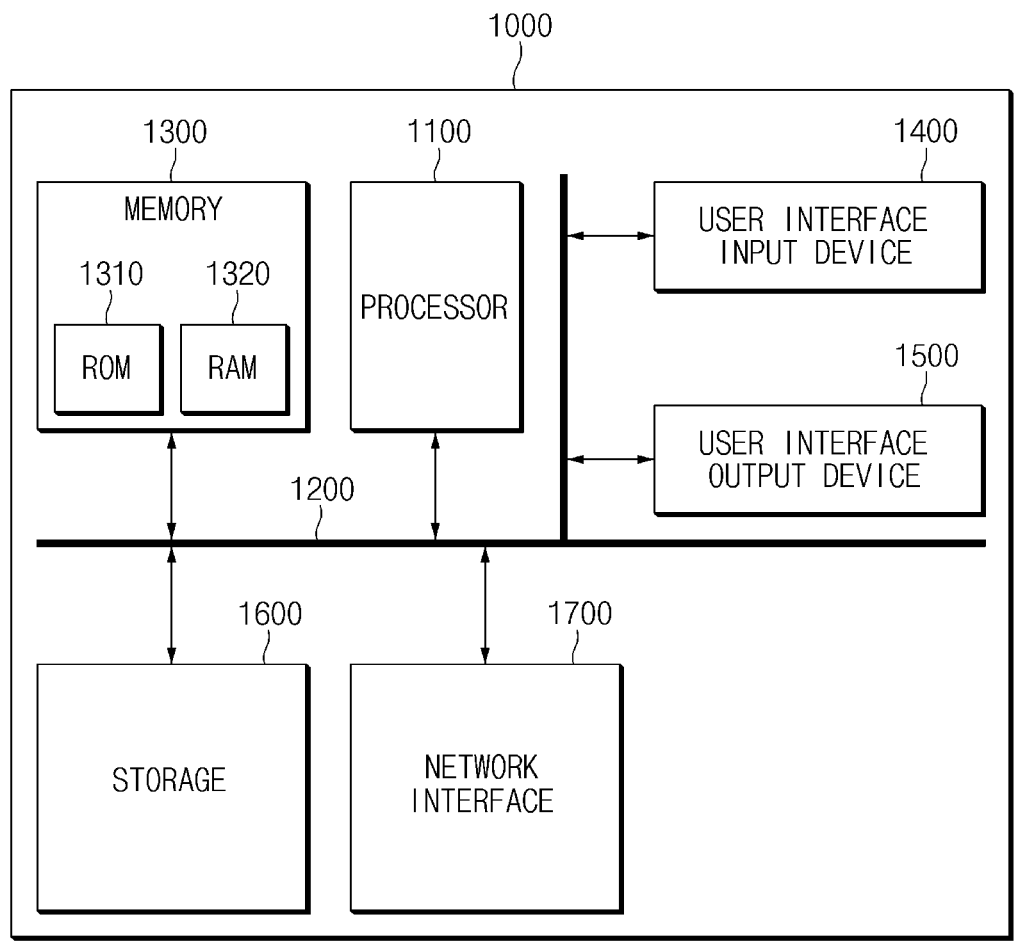
FIG. 11 illustrates a computing system.

FIG. 11 illustrates a computing system, according to one form of the present disclosure.

Referring to FIG. 11, a computing system 1000 may include at least one processor 1310, a memory 1300, a user interface input device 1320, a user interface output device 1330, a storage 1340, and a network interface 1400, which are connected with each other via a bus 1200.

The processor 1310 may be a central processing unit (CPU) or a semiconductor device for processing instructions stored in the memory 1300 or the storage 1340. Each of the memory 1300 and the storage 1340 may include various types of volatile or non-volatile storage media. For example, the memory 1300 may include a read only memory (ROM) and a random access memory (RAM).

Thus, the operations of the methods or algorithms described in connection with the forms disclosed in the present disclosure may be directly implemented with a hardware module, a software module, or the combinations thereof, executed by the processor 1310. The software module may reside on a storage medium (i.e., the memory 1300 or the storage 1340), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1310. The processor 1310 may read out information from the storage medium and may write information in the storage medium. Alternatively, the storage medium may be integrated with the processor 1310. The processor and storage medium may reside in an application specific integrated circuit (ASIC). The ASIC may reside in a user terminal. Alternatively, the processor and the storage medium may reside as separate components of the terminal of the user.

As described above, according to the present disclosure, the virtual lane information obtained by converting lane information measured by the preceding vehicle in viewpoint of the following vehicle may be provided to a driver of the following vehicle, thereby allowing the driver of the following vehicle to safely drive the following vehicle based on the virtual lane information even if the visual field of the driver of the following vehicle is obstructed, Besides, a variety of effects directly or indirectly understood through the disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, the exemplary forms of the present disclosure are provided to explain the spirit and scope of the present disclosure, but not to limit them, so that the spirit and scope of the present disclosure is not limited by the exemplary forms.

What is claimed is:

1. An apparatus for displaying a virtual lane, the apparatus comprising:
   a processor configured to:
   generate the virtual lane by converting lane information of a preceding vehicle into lane information viewed in a viewpoint of a host vehicle, in platooning; and
   a display configured to display the virtual lane,
   wherein the processor is configured to:
   convert lane information, which is measured based on a camera coordinate system, of the preceding vehicle, into information based on a world coordinate system.

2. The apparatus of claim 1, wherein the processor is configured to:
   determine whether a failure occurs during the platooning, based on at least one of a communication state, a front sensor state, or an inter-vehicle distance state.

3. The apparatus of claim 1, wherein the processor is configured to:
   convert the converted lane information viewed in the viewpoint of the host vehicle into lane information viewed in a viewpoint of an augmented reality image.

4. The apparatus of claim 1, wherein the processor is configured to:
   rotate the lane information of the preceding vehicle based on a heading angle of the preceding vehicle and a heading angle of the host vehicle.

5. The apparatus of claim 4, wherein the processor is configured to:
   shift the rotated lane information by a lateral distance and a longitudinal distance from an origin point of the host vehicle to an origin point of the preceding vehicle.

6. The apparatus of claim 1, wherein the processor is configured to:
   determine whether generation of a route of the host vehicle is possible, based on a measurement state of at least one of a vehicle speed, a yaw rate, or a steering angle of the host vehicle.

7. The apparatus of claim 6, wherein the processor is configured to:
   generate the route of the host vehicle based on the at least one of the vehicle speed, the yaw rate, or the steering angle.

8. The apparatus of claim 7, wherein the processor is configured to:
   display the route of the host vehicle on a virtual lane, which is generated through a conversion in the viewpoint of the host vehicle.

9. The apparatus of claim 1, wherein the processor is configured to:
   when a vehicle speed of the host vehicle is less than a predetermined value, calculate a radius of a host vehicle moving route based on a steering gear ratio, a wheel base, or a steering angle, of the host vehicle.

10. The apparatus of claim 9, wherein the processor is configured to:
    when the vehicle speed is equal to or greater than the predetermined value, calculate the radius of the host vehicle moving route using the vehicle speed and a yaw rate of the host vehicle.

11. The apparatus of claim 10, wherein the processor is configured to:
    generate a route of the host vehicle based on an origin point of the host vehicle by using the radius of the host vehicle moving route.

12. The apparatus of claim 1, wherein the processor is configured to:
    display a route of the host vehicle by converting the route of the host vehicle into a route viewed in a viewpoint of an augmented reality image.

13. The apparatus of claim 1, wherein the processor is configured to:
    determine a lane departure time point by using the lane information of the preceding vehicle and a route of the host vehicle; and
    when the lane departure time point is less than a predetermined value, provide a lane departure warning.

14. The apparatus of claim 1, wherein the processor is configured to:
    when a distance between at least one point of points of the virtual lane and a central point of a route of the host vehicle is equal to or less than a predetermined distance, determine that determination of a lane departure time point is possible.

15. The apparatus of claim 14, wherein the processor is configured to:
    determine a lane departure predicted point which has a greatest longitudinal distance from the host vehicle within one or more points of the virtual lane which are equal to or less than a predetermined distance from a central point of the route of the host vehicle.

16. The apparatus of claim 15, wherein the processor is configured to:
    calculate a lane departure predicted time by using a vehicle speed of the host vehicle and a distance to the lane departure predicted point from a present point of the host vehicle; and
    when the lane departure predicted time is less than a predetermined value, provide a lane departure warning.

17. The apparatus of claim 16, wherein the processor is configured to:
    display a warning message for the lane departure warning in a pop-up form on the virtual lane; and
    display a departure lane, which includes the lane departure predicted point, of virtual lanes, differently in color or thickness, or display the departure lane to be flickered.

18. The apparatus of claim 1, wherein the display is configured to display the virtual lane, a host vehicle moving route, and a lane departure warning in a form of an augmented reality image on a wind shield glass of the host vehicle.

19. A method for displaying a virtual lane, the method comprising:
- generating, by a processor, the virtual lane by converting lane information of a preceding vehicle into lane information viewed in a viewpoint of a host vehicle, in platooning; and
- displaying, by a display, the virtual lane obtained through the conversion in the viewpoint of the host vehicle,
- wherein generating the virtual lane includes:
  - converting lane information, which is measured based on a camera coordinate system, of the preceding vehicle, into information based on a world coordinate system.

* * * * *